US011838995B2

(12) United States Patent
Hammer et al.

(10) Patent No.: US 11,838,995 B2
(45) Date of Patent: Dec. 5, 2023

(54) EXHAUST GAS HEATER AND METHOD FOR MAKING THE SAME

(71) Applicant: Purem GmbH, Neunkirchen (DE)

(72) Inventors: Jochen Hammer, Stuttgart (DE); Fabian Frobenius, Stuttgart (DE); Holger Brenner, Stuttgart (DE); Dietmar Kuschel, Murr (DE); Fatih Uysal, Plochingen (DE); Jürgen Häberle, Stuttgart (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/822,486

(22) Filed: Aug. 26, 2022

(65) Prior Publication Data
US 2023/0061713 A1  Mar. 2, 2023

(30) Foreign Application Priority Data
Aug. 26, 2021 (DE) ...................... 10 2021 122 082.3

(51) Int. Cl.
 *H05B 3/16* (2006.01)
(52) U.S. Cl.
 CPC ............ *H05B 3/16* (2013.01); *F01N 2240/16* (2013.01); *H05B 2203/016* (2013.01); *H05B 2203/017* (2013.01); *H05B 2203/022* (2013.01)
(58) Field of Classification Search
 CPC . F01N 2240/16; H05B 3/16; H05B 2203/017; H05B 2203/022; H05B 2240/16
 USPC .......................................................... 60/320
 See application file for complete search history.

(56) References Cited

U.S. PATENT DOCUMENTS

| 5,463,206 | A | 10/1995 | Abe et al. |
| 2020/0072107 | A1* | 3/2020 | Aufranc ................ F01N 3/2013 |
| 2022/0186647 | A1 | 6/2022 | Saurat et al. |

FOREIGN PATENT DOCUMENTS

| DE | 20 2021 102 620 U1 | 7/2021 |
| DE | 10 2021 109 568 A1 | 9/2022 |
| EP | 4 047 195 A1 | 8/2022 |
| JP | H05-144549 A | 6/1993 |
| JP | 2002-260831 A | 9/2002 |
| JP | 2002-295236 A | 10/2002 |

* cited by examiner

Primary Examiner — Jorge L Leon, Jr.
(74) Attorney, Agent, or Firm — Walter Ottesen, P.A.

(57) ABSTRACT

An exhaust gas heater for an exhaust gas system of an internal combustion engine includes a carrier arrangement, a heating conductor arrangement which is supported on the carrier arrangement and has at least one current-carrying heating conductor, and a connecting arrangement for the fixed connection of the heating conductor arrangement to the carrier arrangement. The heating conductor arrangement is supported on the carrier arrangement in an electrically insulated manner via the connecting arrangement. The connecting arrangement includes a plurality of connecting elements, the heating conductor arrangement being supported on at least one connecting element via an insulating carrier unit in an electrically insulated manner with regard to the at least one connecting element.

20 Claims, 2 Drawing Sheets

EXHAUST GAS HEATER AND METHOD FOR MAKING THE SAME

CROSS REFERENCE TO RELATED APPLICATION

This application claims priority of German patent application no. 10 2021 122 082.3, filed Aug. 26, 2021, the entire content of which is incorporated herein by reference.

TECHNICAL FIELD

The disclosure relates to an exhaust gas heater, by way of which, in an exhaust gas system of a motor vehicle, heat can be transmitted to the exhaust gas which is flowing therein and is emitted by an internal combustion engine, in order to bring system regions which are arranged downstream with regard to the exhaust gas heater such as, for example, catalytic converters or particulate filters to operating temperature more rapidly, in particular in a start phase of the operation of an internal combustion engine.

BACKGROUND

The subsequently published German patent application DE 10 2021 109 568 has disclosed an exhaust gas heater, in the case of which two heating conductors of a heating conductor arrangement which are of substantially plate-like or flat configuration and are provided by being cut out of a flat material are arranged so as to follow one another in an exhaust gas main flow direction which corresponds to an exhaust gas heater longitudinal direction, between two substantially plate-like carrier elements of a carrier arrangement which are constructed from sheet metal material. The layered construction of carrier elements and heating conductors which are arranged in between is held together by way of a connecting arrangement with a plurality of connecting elements of bolt-like configuration. In order to achieve electrical insulation of the heating conductors with regard to the carrier elements and also with regard to one another, a plurality of supporting units made from electrically insulating material, for example ceramic material, are arranged in each case between them. The layered construction of carrier elements, heating conductors and supporting units which are arranged in between is held together by way of the connecting elements of the connecting arrangement.

SUMMARY

It is an object of the disclosure to provide an exhaust gas heater and a method for producing an exhaust gas heater of this type, by way of which stable electrically insulated securing of the heating conductor arrangement on the carrier arrangement can be ensured.

According to the disclosure, this object can, for example, be achieved by way of an exhaust gas heater for an exhaust gas system of an internal combustion engine, including:
  a carrier arrangement,
  a heating conductor arrangement which is supported on the carrier arrangement and has at least one current-carrying heating conductor,
  a connecting arrangement for the fixed connection of the heating conductor arrangement to the carrier arrangement, the heating conductor arrangement being supported on the carrier arrangement in an electrically insulated manner via the connecting arrangement, the connecting arrangement including a plurality of connecting elements, the heating conductor arrangement being supported on at least one connecting element via an insulating carrier unit in an electrically insulated manner with regard to the at least one connecting element.

In the case of an exhaust gas heater which is constructed according to the disclosure, defined securing of the heating conductor arrangement on the carrier arrangement is not achieved by way of supporting elements which act between the carrier arrangement and the heating conductor arrangement axially with regard to an exhaust gas heater longitudinal axis, but rather by way of electrically insulated securing of the heating conductor arrangement on at least one connecting element of the connecting arrangement, which at least one connecting element is in turn connected fixedly to the carrier arrangement.

It is to be noted in this context that, in order to increase the stability, a plurality of, usually preferably all, the connecting elements of the connecting arrangement can preferably be used to provide a carrier function of this type for the heating conductor arrangement.

This supporting action of the connecting arrangement can be provided by virtue of the fact that the at least one connecting element includes a shank, and that the insulating carrier unit includes a carrier sleeve, which surrounds the shank, and insulating material which supports the carrier sleeve on the shank.

The fixed combination of the heating conductor arrangement with the connecting arrangement can be provided by virtue of the fact that the heating conductor arrangement includes at least one heating conductor which is connected fixedly to at least one carrier sleeve. To this end, for example, the at least one heating conductor can be connected fixedly to each carrier sleeve by way of an integrally joined connection, preferably welding or soldering.

For a high heating capacity, the heating conductor arrangement can include a plurality of heating conductors which are arranged at a spacing from one another so as to follow one another in the direction of an exhaust gas heater longitudinal axis. Each of these heating conductors can be connected fixedly to at least one, preferably each, carrier sleeve.

In order to obtain a stable supporting function by way of the insulating material, the latter can provide an integrally joined connection to the shank and the carrier sleeve.

In order to achieve this integrally joined connection both to the shaft and to the carrier sleeve, the insulating material can be introduced in a flowable state into an intermediate space which is formed between the shank and the carrier sleeve. To this end, for example, the insulating material can include glass ceramic material which is poured into the intermediate space in a molten state. A construction of the insulating carrier units which is resistant, in particular, to the penetration of moisture is achieved by way of the insulating material which is introduced in a flowable state and then hardens.

In the case of one alternative embodiment, the insulating material can provide a non-positive connection, that is, a connection by way of friction locking, to the shank and the carrier sleeve.

To this end, the insulating material can be introduced, by way of being pressed in, into an intermediate space which is formed between the shank and the carrier sleeve. Here, for example, the insulating material can include pressed powder material, preferably magnesium oxide material, or pressed fiber material, preferably glass fiber matting material.

For a stable construction of the exhaust gas heater, the carrier arrangement can include two carrier elements which are arranged at a spacing from one another in the direction of the exhaust gas heater longitudinal axis and receive the heating conductor arrangement between them, and the heating conductor arrangement can be supported on the carrier arrangement via the connecting arrangement at an axial spacing from each of the carrier elements.

In order to avoid an electrical short circuit here via the or each carrier sleeve which is generally constructed with metal material, it is proposed that the carrier sleeve is arranged at an axial spacing from each of the carrier elements.

Furthermore, the disclosure relates to an exhaust gas system for an internal combustion engine, including at least one exhaust gas heater which is constructed according to the disclosure.

Furthermore, the disclosure relates to a method for producing an exhaust gas heater according to the disclosure, including the measures:
a) providing of at least one connecting element/carrier sleeve assembly with a carrier sleeve which surrounds a shank of a connecting element, with insulating material mounted in between, and is supported on the shank by way of the insulating material,
b) connecting of the heating conductor arrangement fixedly to the carrier sleeve of the at least one connecting element/carrier sleeve assembly in order to provide a connecting arrangement/heating conductor arrangement assembly,
c) connecting of the connecting arrangement/heating conductor arrangement assembly to the carrier arrangement.

In order for it to be possible for the individual components of the connecting element/carrier sleeve assemblies to be produced to be handled easily in the case of measure a), it is proposed that measure b) is carried out after measure a). This means that first of all the carrier sleeves are connected fixedly to the associated connecting elements via the insulating material, and afterward the carrier sleeves are connected to associated heating conductors of a respective heating conductor arrangement. In the case of an alternative procedure, measure b) can be carried out before measure a). This means that first of all one or more carrier sleeves is/are connected to the associated heating conductors of a respective heating conductor arrangement, and then a connecting element is connected by way of its shank to the carrier sleeve in an electrically insulated manner via the insulating material, in assignment to each carrier sleeve of this type. Here, measures a) and b) therefore merge into one another or are nested within one another. Measure c) is preferably not carried out until measures a) and b) have been carried out.

In the case of measure a), the insulating material can be introduced in a flowable state into an intermediate space which is formed between the shank and the carrier sleeve. In the case of an alternative embodiment, in the case of measure a), the insulating material can be pressed into the intermediate space which is formed between the shank and the carrier sleeve.

For a mechanically stable construction which is resistant to the chemical effect of exhaust gas, it is proposed that, in the case of measure b), at least one heating conductor, preferably a plurality of heating conductors, is/are connected fixedly to the carrier sleeve by way of an integrally joined connection.

For the fixed attachment to the carrier arrangement, in the case of measure c), the shank of the at least one connecting element/carrier sleeve assembly can be connected to a carrier element of the carrier arrangement, preferably by way of a screw connection and/or an integrally joined connection, in at least one, preferably every, end region which lies in the direction of an exhaust gas heater longitudinal axis.

BRIEF DESCRIPTION OF THE DRAWINGS

The invention will now be described with reference to the drawings wherein.

DESCRIPTION OF THE PREFERRED EMBODIMENTS

Figure 1:
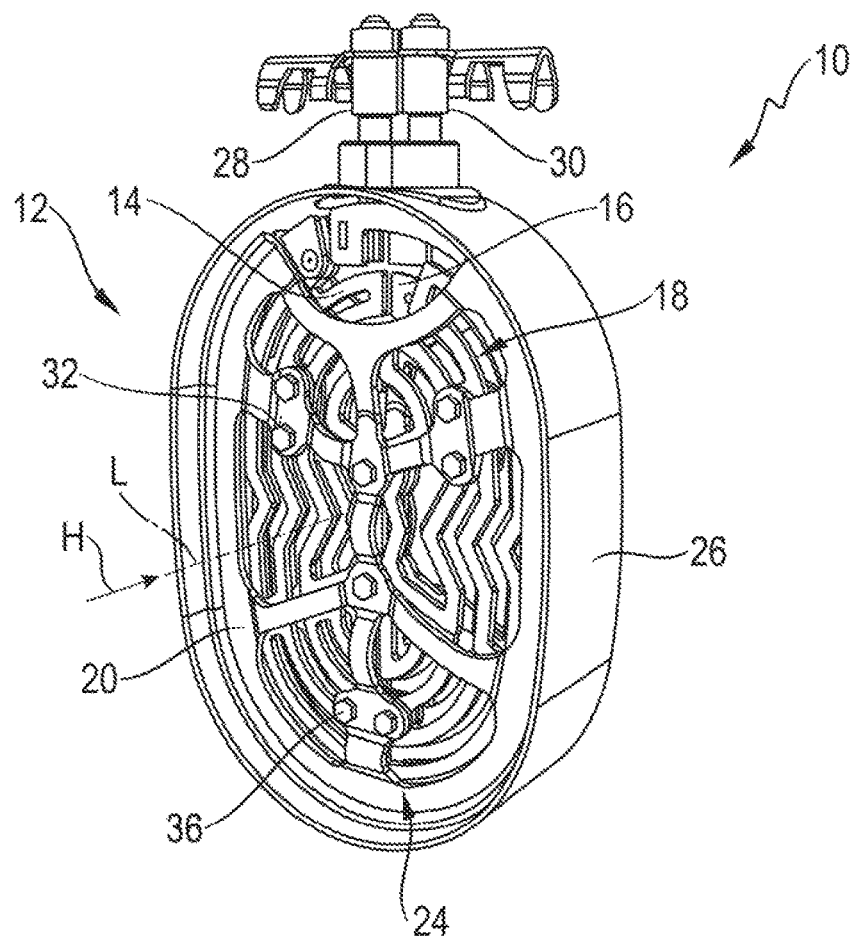
FIG. 1 shows a perspective view of an exhaust gas heater.
Figure 2:
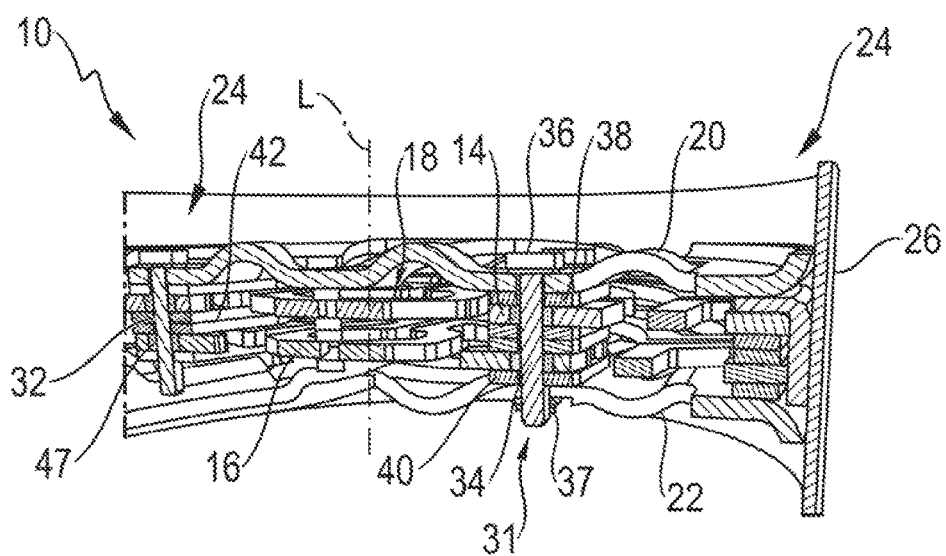
FIG. 2 shows a longitudinal sectional view of the exhaust gas heater from FIG. 1; and,
FIG. 3 shows a detailed view of the electrically insulated securing of a heating conductor arrangement on a carrier arrangement of an exhaust gas heater.

Before the way according to the disclosure of electrically insulated securing of a heating conductor arrangement on a carrier arrangement of an exhaust gas heater is described in detail with reference to FIG. 3, the fundamental construction of an exhaust gas heater 10 of this type for an exhaust gas system 12 of an internal combustion engine, for example in a motor vehicle, will be described with reference to FIGS. 1 and 2.

In the exhaust gas system 12, an exhaust gas heater 10 of this type can be flowed through by exhaust gas in an exhaust gas main flow direction H, and has two heating conductors 14, 16 of a heating conductor arrangement which is denoted in general by 18, which heating conductors 14, 16 are arranged so as to follow one another in the direction of an exhaust gas heater longitudinal axis L and can therefore be flowed around one after another by exhaust gas which flows substantially in the exhaust gas main flow direction H. The heating conductors 14, 16 are constructed substantially in a plate-like manner or from flat material, and can be produced with their structure, provided by way of a plurality of sections which run in a meandering structure, by way of being cut out from a flat material blank, in particular a metal blank.

Carrier elements 20, 22 of substantially plate-like configuration of a carrier arrangement which is denoted in general by 24 are provided on those sides of the two heating conductors 14, 16 which lie facing away from one another in the direction of the exhaust gas heater longitudinal axis L. On their outer circumferential region, the plate-like carrier elements 20, 22 are fixed on a substantially cylindrical carrier housing 26.

The two heating conductors 14, 16 can be connected in series or parallel to one another. For the electrical connection to a voltage source, two connecting units 28, 30 which penetrate the carrier housing 26 are provided, which connecting units 28, 30 are connected in an electrically conducting manner to the heating conductors 14, 16 in the interior space which is surrounded by the carrier housing 26.

In order to obtain a stable combination, the two carrier elements 20, 22 and the heating conductors 14, 16 which are arranged in between and lie directly adjacently with respect to one another are connected fixedly to one another by way of a connecting arrangement 31 with a plurality of connecting elements 32 of bolt-like configuration. The connecting elements 32 can be configured, for example, as threaded bolts with a shank 34 and a head 36. A nut element 37, for example, can be screwed onto the shank 34, in order to clamp in the layered construction of carrier elements 20, 22 and heating conductors 14, 16 between the head 36 and the nut element 37.

In order to achieve electrical insulation of the heating conductors 14, 16 with regard to the carrier elements 20, 22 of the carrier arrangement 24 which are generally constructed from metal material, a carrier arrangement supporting unit 38 which is constructed with electrically insulating material, for example ceramic material, is of substantially plate-like configuration and is penetrated by the associated connecting element 32 in the region of an opening provided therein is provided between the heating conductor element 14 and the carrier element 20, for example in assignment to each connecting element 32. A carrier element supporting unit 40 which is arranged between the heating conductor 16 and the carrier element 22 is likewise provided, for example in assignment to each connecting element 32.

In order to support the two heating conductors 14, 16 which lie next to one another in an electrically insulated manner with regard to one another, a heating conductor supporting unit 42 is provided, for example in assignment to each connecting element 32. Each heating conductor supporting unit 42 is also of substantially plate-like configuration with one or more disks, and is constructed with ceramic material. Sleeve-like insulating elements 47 are inserted into the openings formed in the heating conductors 14, 16 where the heating conductors 14, 16 are penetrated by the connecting element 32, in order to achieve defined positioning of the connecting element 32 in the openings which are provided in the heating conductors 14, 16.

In the following text, it is described in detail with reference to FIG. 3 how, in accordance with the principles of the present disclosure, the heating conductor arrangement 18 can be supported on the carrier arrangement 24 or the two carrier elements 20, 22 thereof in an electrically insulated manner via the connecting arrangement 31 or the connecting elements 32 thereof, in an exhaust gas heater 10 with the construction described in the preceding text with regard to its fundamental structure, without the above-described supporting units 38, 40, 42 being required for this purpose.

Figure 3:
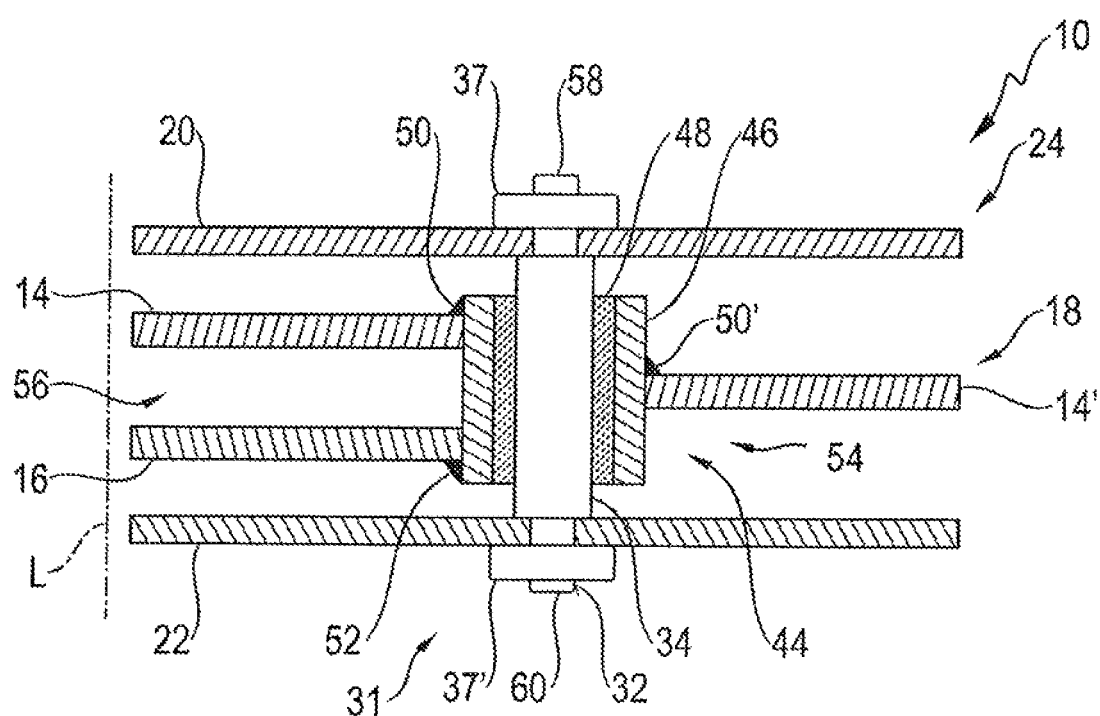

FIG. 3 shows a detailed view of the exhaust gas heater 10 in the region of a connecting element 32 of the connecting arrangement 31. Here, FIG. 3 shows, in its regions which lie to the left and right of the connecting element 32 which is shown, two different embodiments of the heating conductor arrangement 18. In the region which lies to the left of the connecting element 32, a heating conductor arrangement 18 with two heating conductors 14, 16 which follow one another in the direction of the exhaust gas heater longitudinal axis L and are arranged at a spacing from one another is shown. In the region which lies to the right of the connecting element 32, a heating conductor arrangement 18 with only a single heating conductor 14' is shown in FIG. 3. The way in which the heating conductor arrangement 18 is supported in a way described in the following text via the connecting arrangement 32 on the carrier arrangement 24 or the two carrier elements 20, 22 thereof is independent, however, of the number of heating conductors of the heating conductor arrangement 18.

FIG. 3 shows that each of the heating conductors 14, 16 or 14' of the heating conductor arrangement 18 is not realized on the carrier arrangement 24 by way of a supporting arrangement which acts between the heating conductors 14, 16 or 14' and the carrier elements 20, 22, but rather that the heating conductors 14, 16 or the single heating conductor 14' is supported on the carrier arrangement 24 in an electrically insulated manner via an insulating carrier unit 44 which is provided in assignment to the connecting element 32. It is noted that an insulating carrier unit 44 of this type which establishes a fixed combination with the heating conductor arrangement 18 is preferably provided in assignment to a plurality of, most preferably in assignment to each connecting element 32 of the connecting arrangement 31.

The insulating carrier unit 44 includes a carrier sleeve 46 which surrounds the shank 34 of the connecting element 32 which is configured as a step bolt. An intermediate space which is formed between the carrier sleeve 46, of ring-like configuration and preferably surrounding the shank 34 in its entire peripheral region, and the shank 34 is filled with insulating material 48. The insulating material 48 produces a combination, fixed both in the radial direction and in the axial direction, of the shank 34 of the connecting element 32 with the carrier sleeve 46.

The heating conductor arrangement 18 or its heating conductors 14, 16 or 14' are connected fixedly to the carrier sleeve 46 by way of an integrally joined connection, for example by way of welds 50, 52 or 50' which can be seen in FIG. 3. For example, where a fixed connection of this type to the carrier sleeve 46 is to be produced, the heating conductors 14, 16 or 14' can have an opening, through which the carrier sleeve 46 is guided and is then connected to the respective heating conductor 14, 16 or 14' by way of a welded seam which, for example, runs around it completely or by way of spot welding.

Since the carrier sleeve 46 is dimensioned in such a way and fixed on the shank 34 of the connecting element 32 in such a way that it is at an axial spacing from the two carrier elements 20, 22 which are likewise constructed with metal material, for example, there is no possibility of an electrical short circuit between the carrier elements 20, 22 and the carrier sleeve 46. Via the insulating carrier unit 44 and the connecting element 32 or each connecting element 32 which interacts with an insulating carrier unit 44 of this type, the heating conductor arrangement 18 is therefore held in a defined position axially between the two carrier elements 20, 22 of the carrier arrangement 24. Additional measures for axial support of the heating conductors 14, 16 or 14' are not required.

The fixed combination of the carrier sleeve 46 with the shank 34 of the connecting element 32 can be produced, for example, by virtue of the fact that the insulating material 48 is poured in a flowable, for example molten, state into the intermediate space which is formed between the carrier sleeve 46 and the shank 34. To this end, for example, glass ceramic material can be used which, after hardening, provides an adhesive, integrally joined connection both to the shank 34 and to the carrier sleeve 46.

In the case of one alternative embodiment, the insulating material 48 can be introduced, by way of being pressed in, into the intermediate space which is formed between the carrier sleeve 46 and the shank 34. For this purpose, for example, pulverulent material such as, for example, magnesium oxide material can be used which is introduced into the intermediate space and is then pressed therein in such a way that a stable composite of the initially pulverulent material is produced per se and, as a result, also a non-positive connection, that is, a frictional connection, with regard to the outer peripheral face of the shank 34 and the inner peripheral face of the carrier sleeve 46. In order to strengthen this composite, a bonding agent which strengthens the structural cohesion of the insulating material 48 can be integrated into this insulating material 48 which is initially pulverulent.

In the case of a further alternative embodiment, the insulating material can include fiber material such as, for example, fiber matting material which is also used, for example, to hold catalytic converter blocks in substantially tubular catalytic converter housings of exhaust gas systems. To this end, for example, the shank 34 can be surrounded with fiber material, and the carrier sleeve 46 can thereupon be pushed onto the shank 34 which is surrounded with the fiber material or the fiber matting material, the fiber material being pressed and producing the fixed combination between the shank 34 and the carrier sleeve 46 by way of a frictionally locking connection.

During the production of an exhaust gas heater 10 of this type, for example, a procedure can be carried out in such a way that a connecting element/carrier sleeve assembly 54 is first of all provided with the or each connecting element 32 of the connecting arrangement 31 and a respective associated carrier sleeve 46, by virtue of the fact that the carrier sleeve 46 is fixed on the associated connecting element 32 by way of introduction of the insulating material 48 in one of the above-described ways. The connecting element/carrier sleeve assemblies 54 which are provided in this way can then be connected fixedly to the heating conductors 14, 16 or 14' of the heating conductor arrangement 18 in the next method step, in order to provide a connecting arrangement/heating conductor arrangement assembly 56 in this way. To this end, the carrier sleeves 46 of the connecting element/carrier sleeve assemblies 54 which are to be provided in the case of an exhaust gas heater 10 can be connected fixedly in the above-described way to the heating conductor or conductors of the heating conductor arrangement 18 by way of the production of the welds 50, 52 or 50', possibly by way of soldering in an alternative procedure.

The connecting arrangement/heating conductor arrangement assembly 56 which is produced in this way can then be connected to the two carrier elements 20, 22 of the carrier arrangement 24, by threaded sections which are provided in the axial end regions 58, 60 of the connecting elements 32 which are configured as step pins being guided through associated openings in the carrier elements 20, 22, and nut elements 37, 37' then being screwed onto these threaded sections. As an alternative, the axial end regions 58, 60 of the connecting elements 32 might also be fixed on the carrier elements 20, for example, by way of an integrally joined connection, for example welding.

In the case of an alternative procedure, the heating conductor arrangement 18 can first of all be connected fixedly to the carrier sleeve or carrier sleeves 46, for example by way of an integrally joined connection. The associated connecting elements 32 can thereupon be introduced into the carrier sleeves 46 which are already connected to the heating conductors 14, 16 or 14' of the heating conductor arrangement 18, and can be fixed therein by way of the insulating material 48. The measure for providing a respective connecting element/carrier sleeve assembly 54 is therefore in this way after the measure for connecting the heating conductor arrangement 18 to the carrier sleeve or carrier sleeves 46. The measure for providing the connecting arrangement/heating conductor arrangement assembly 56 therefore takes place before or nested inside the measure for providing the connecting element/carrier sleeve assembly 54.

In a structurally simple embodiment, reliable and electrically insulated securing of a heating conductor arrangement on a carrier arrangement of an exhaust gas heater is realized by way of the construction of an exhaust gas heater provided or to be provided according to the disclosure, which securing is resistant mechanically and thermally and also against chemical influences on account of the connections used of various components to one another.

It is understood that the foregoing description is that of the preferred embodiments of the invention and that various changes and modifications may be made thereto without departing from the spirit and scope of the invention as defined in the appended claims.

What is claimed is:

1. An exhaust gas heater for an exhaust gas system of an internal combustion engine, the exhaust gas heater comprising:
   a carrier arrangement;
   a heating conductor arrangement supported on said carrier arrangement and having at least one current-carrying heating conductor;
   a connecting arrangement for fixedly connecting the heating conductor arrangement to said carrier arrangement;
   said heating conductor arrangement being supported on said carrier arrangement in an electrically insulated manner by said connecting arrangement; and,
   said connecting arrangement including a plurality of connecting elements, said heating conductor arrangement being supported on at least one connecting element of said plurality of connecting elements via an insulating carrier unit so as to electrically insulate said heating conductor arrangement from said at least one connecting element.

2. The exhaust gas heater of claim 1, wherein:
   said at least one connecting element includes a shank;
   said insulating carrier unit supporting said heating conductor arrangement on said at least one connecting element includes a carrier sleeve surrounding said shank; and,
   insulating material supports said carrier sleeve on said shank.

3. The exhaust gas heater of claim 2, wherein said heating conductor arrangement includes at least one heating conductor fixedly connected to said carrier sleeve.

4. The exhaust gas heater of claim 3, wherein said at least one heating conductor is connected fixedly to said carrier sleeve via an integrally joined connection.

5. The exhaust gas heater of claim 4, wherein said integrally joined connection is provided via welding or soldering.

6. The exhaust gas heater of claim 3, wherein said exhaust gas heater defines a longitudinal axis (L) and said heating conductor arrangement includes a plurality of said current-carrying heating conductors spaced one from the other so as to follow one another in a direction of said longitudinal axis (L); and, each one of said heating conductors is fixedly connected to said carrier sleeve.

7. The exhaust gas heater of claim 2, wherein said insulating material provides an integrally joined connection to said shank and said carrier sleeve.

8. The exhaust gas heater of claim 2, wherein said shank and said carrier sleeve conjointly define an intermediate space therebetween; and, wherein at least one of: i) said insulating material is introduced in a flowable state into an intermediate space; and, ii) said insulating material includes glass ceramic material.

9. The exhaust gas heater of claim 2, wherein said insulating material provides a frictional connection to said shank and said carrier sleeve.

10. The exhaust gas heater of claim 2, wherein said shank and said carrier sleeve conjointly define an intermediate space therebetween; and, wherein at least one of:

i) said insulating material is pressed into said intermediate space; and, ii) said insulating material includes pressed powder material including at least one of:
   a) magnesium oxide;
   b) pressed fiber material; and,
   c) glass fiber matting material.

11. The exhaust gas heater of claim 1, wherein said exhaust gas heater defines a longitudinal axis (L); said carrier arrangement includes two carrier elements arranged at a spacing from one another in the direction of said exhaust gas heater longitudinal axis (L); said heating conductor arrangement is disposed in said spacing between said two carrier elements; and, said heating conductor arrangement is supported on said carrier arrangement via said connecting arrangement at an axial spacing from each of said carrier elements.

12. The exhaust gas heater of claim 11, wherein:
said at least one connecting element includes a shank;
said insulating carrier unit includes a carrier sleeve surrounding said shank; and,
insulating material supports said carrier sleeve on said shank;
wherein said carrier sleeve is arranged at an axial spacing from each of said carrier elements.

13. An exhaust gas system for an internal combustion engine, the exhaust gas system comprising:
an exhaust gas heater including:
a carrier arrangement having a carrier housing for receiving an exhaust gas flow in an exhaust gas main flow direction along an exhaust gas heater longitudinal axis;
a heating conductor arrangement supported on said carrier arrangement and having at least one current-carrying heating conductor;
a connecting arrangement for fixedly connecting the heating conductor arrangement to said carrier arrangement;
said heating conductor arrangement being supported on said carrier arrangement in an electrically insulated manner by said connecting arrangement; and,
said connecting arrangement including a plurality of connecting elements, said heating conductor arrangement being supported on at least one connecting element of said plurality of connecting elements via an insulating carrier unit so as to electrically insulate said heating conductor arrangement from said at least one connecting element.

14. A method of making an exhaust gas heater including a carrier arrangement; a heating conductor arrangement supported on said carrier arrangement and having at least one current-carrying heating conductor; a connecting arrangement for fixedly connecting the heating conductor arrangement to said carrier arrangement; said heating conductor arrangement being supported on said carrier arrangement in an electrically insulated manner by said connecting arrangement; and, said connecting arrangement including a plurality of connecting elements and, in association with at least one connecting element of said plurality of connecting elements, an insulating carrier unit for supporting said heating conductor arrangement on said at least one connecting element of said plurality of connecting elements so as to electrically insulate said heating conductor arrangement from said at least one connecting element of said plurality of connecting elements, the method comprising:

a) providing at least one connecting element/carrier sleeve assembly with a carrier sleeve which surrounds a shank of a connecting element, with insulating material mounted in between, and is supported on the shank via the insulating material;

b) connecting the heating conductor arrangement fixedly to the carrier sleeve of the at least one connecting element/carrier sleeve assembly to provide a connecting arrangement/heating conductor arrangement assembly; and, c) connecting the connecting arrangement/heating conductor arrangement assembly to the carrier arrangement.

15. The method of claim 14, wherein step b) is carried out before step a).

16. The method of claim 14, wherein step b) is carried out after step a).

17. The method of claim 14, wherein step a) comprises introducing the insulating material in a flowable state into an intermediate space formed between the shank and the carrier sleeve.

18. The method of claim 14, wherein step a) comprises pressing the insulating material into an intermediate space formed between the shank and the carrier sleeve.

19. The method of claim 14, wherein step b) comprises fixedly connecting at least one heating conductor to the carrier sleeve via an integrally joined connection.

20. The method of claim 14, wherein the exhaust gas heater defines a longitudinal axis (L); and, wherein step c) comprises connecting the shank of the at least one connecting element/carrier sleeve assembly to a carrier element of the carrier arrangement via at least one of:
   i) a screw connection; and,
   ii) an integrally joined connection in at least one end region lying in a direction of the exhaust gas heater longitudinal axis (L).

* * * * *